United States Patent [19]

Nonaka et al.

[11] 4,420,246
[45] Dec. 13, 1983

[54] MULTIPLE REPRODUCTION APPARATUS

[75] Inventors: Mitsuhiro Nonaka; Yuichi Kobayashi, both of Yokohama, Japan

[73] Assignee: Ricoh Company, Ltd., Japan

[21] Appl. No.: 318,424

[22] Filed: Nov. 5, 1981

[30] Foreign Application Priority Data

Nov. 6, 1980 [JP] Japan .................................. 55-156228

[51] Int. Cl.³ ............................................ G03G 15/00
[52] U.S. Cl. ...................................... 355/14 R; 355/8; 355/14 SH
[58] Field of Search ..................... 355/8, 14 SH, 3 SH, 355/14 R, 11

[56] References Cited

U.S. PATENT DOCUMENTS

| 4,139,300 | 2/1979 | Katayama et al. | 355/8 X |
| 4,211,482 | 7/1980 | Arai et al. | 355/8 |
| 4,310,241 | 1/1982 | Inoue | 355/8 X |
| 4,324,485 | 4/1982 | Asakura et al. | 355/8 |
| 4,332,461 | 6/1982 | Cail et al. | 355/14 R |

*Primary Examiner*—Richard L. Moses
*Attorney, Agent, or Firm*—Guy W. Shoup; Leighton K. Chong

[57] ABSTRACT

An improved multiple reproduction apparatus is provided. The apparatus includes an original holder for holding thereon an original from which multiple copies are to be made and an optical system for leading a light image of the original to a desired position, the optical system constituting a part of the exposure system of the apparatus. Either of the original holder or optical system is movably provided with respect to the other, which is fixedly provided on the apparatus. The present apparatus further comprises wait time control means so that the original holder or optical system stays still for a predetermined period of time at its home position in response to the size of the original or copy paper.

7 Claims, 5 Drawing Figures

MULTIPLE REPRODUCTION APPARATUS

BACKGROUND OF THE INVENTION

1. Field of the Invention

This invention relates to a copying apparatus and more in particular to a multiple reproduction apparatus which is capable of varying the wait time of an original holder or optical system at its home position in accordance with the size of originals or copy papers.

2. Description of the Prior Art

A copying machine capable of making multiple copies in succession is well known. In general, a copying machine includes an original holder for holding an original thereon, a photosensitive member for forming thereon an electrostatic latent image of the original and an optical system for leading the light image of the original to the photosensitive member. In actual machines, the photosensitive member is usually in the form of a drum which is rotatably supported by a machine housing. Such a photosensitive drum is driven to rotate in synchronism with the scanning of the original.

When scanning the original, either the original holder or the optical system must be moved with respect to the other in a reciprocating manner. For example, in carrying out scanning in the system where the original holder moves with respect to the stationary optical system, the original holder advances from its home position to a certain forward position and upon reaching the forward position, the original holder returns to the home position. In making multiple copies from the same original, the original holder stays still for a predetermined period of time and then it again executes its reciprocating movement. Such a wait time at the home position in a multiple reproduction is necessary in order to obtain proper synchronism among associated components. The above also holds true for the system where the original holder is stationary and the optical system is movable with respect to the original holder.

In accordance with prior art copying machines capable of making multiple copies in succession, the wait time of the original holder or optical system at the home position is constant. Therefore, the original holder or optical system, whichever is movable, stays still temporarily for a predtermined period of time at the home position every time when the original holder or optical system returns to the home position in a repetitive copying operation. Thus, in the case where the forward position is varingly determined in accordance with the size of copy papers to be used, the number of copies per unit time is uniquely determined by the copy paper size. For example, if a prior art copying machine has a rated performance of making 28 A4-sized copies per minute, the numbers of copies per minute for differently-sized copies such as A3 and B4 are individually determined according to their sizes.

Therefore, in prior art copying machines, it is not possible to set the number of copies per unit time to an appropriate value. Prior art copying machines having a constant wait time at the home position are particularly disadvantageous in that toner-image fixing performance tends to degrade as use is made of larger-sized copy papers. Such degradation could become worse for modern copying machines in which use is made of an energy-saving type fixing device having a relatively low thermal capacity. That is, if the larger-sized copies are processed with the same time interval between copies as the smaller-sized copies in such a condition, sufficient fixing may not be obtained for the larger-sized copies.

SUMMARY OF THE INVENTION

The disadvantages of the prior art are overcome with the present invention and an improved multiple reproduction apparatus is provided.

The advantages of the present invention are preferably attained by providing a multiple reproduction apparatus capable of varyingly setting the wait time of an original holder or optical system at its home position depending upon the size of originals or copy papers. The present invention includes an original holder for holding thereon an original from which a copy is to be made, an optical system for leading a light image of said original to a desired position, driving means for driving to move either of said original holder or optical system with respect to the other, which is kept stationary, in a reciprocating manner, and wait time control means for controlling the wait time of the movable one of either of said original holder or optical system at its home position in response to the size of the original or copy papers. Preferably, such wait time control means includes size detecting means for detecting the size of originals or copy papers.

Thus, in accordance with the present invention, the wait time of the original holder or optical system, whichever is movable, at the home position of a reciprocating movement may be arbitrarily set to an appropriate value. For example, if relatively larger-sized copy papers are to be used in a repetitive reproduction mode, the wait time at the home position, or time interval between successive copies, may be set longer, thereby preventing the occurrence of degradation in toner image fixing performance.

It is therefore an object of the present invention to provide an improved multiple reproduction apparatus.

Another object of the present invention is to provide a multiple reproduction apparatus capable of making multiple copies of excellent quality with the use of a relatively low capacity thermal fixing device.

A further object of the present invention is to provide a multiple reproduction apparatus capable of setting proper numbers of copies per unit time for differently sized copy papers.

Other objects, advantages and novel features of the present invention will become apparent from the following detailed description of the invention when considered in conjunction with the accompanying drawings.

DESCRIPTION OF THE PREFERRED EMBODIMENTS

Figure 1:
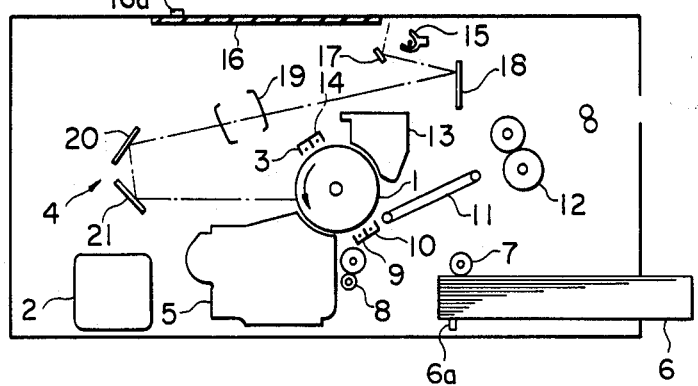
FIG. 1 is a schematic illustration of a copying machine to which the present invention is to be embodied.

Referring now to FIG. 1, a multiple reproduction apparatus includes a photosensitive drum 1 which is rotatably supported by a frame of the apparatus. The drum 1 is driven to rotate at a constant speed in the direction indicated by the arrow by means of a main motor 2 through a power transmission mechanism (not shown). As the drum 1 rotates, its surface is first uniformly charged by a charger 3 to a predetermined polarity. Then, an original light image is exposed to the thus charged surface of the drum 1 through an exposure system 4 thereby forming an electrostatic latent image. The latent image is then developed by a developing device 5 to form a visual toner image.

A quantity of copy papers are stored in a magazine 6, and copy papers are fed to the transfer section of the apparatus one by one by a feed roller 7. As the topmost copy paper is fed by the roller 7, its advancement is temporarily halted when its leading edge comes into contact with a register roller 8. In synchronism with the rotation of the drum 1, the register roller 8 is actuated to resume advancement of the copy paper. Thus, the copy paper is brought into contact with the surface of the drum 1 and transported under a transfer device 9 thereby the toner image formed on the surface of the drum 1 is transferred to the copy paper. Then, the copy paper bearing thereon the transferred toner image is separated from the surface of the drum 1 by a separating device 10 and placed on a conveyor belt 11. At the end of the belt 11 is provided a fixing device 12 where the transferred toner image on the copy paper is fixed, usually by the addition of heat.

On the other hand, after separating the copy paper, the surface of the photosensitive drum 1 is cleaned by a cleaning device 13. Thereafter, a discharger 14 discharges the remaining charges on the cleaned surface of the drum 1, thereby completing one cycle of reproducing operation. The above-described reproduction process is initiated when a copy start switch is turned on and the process is repeated consecutively for a number of times as set by the operator.

The exposure system 4 comprises a lamp 15 for illuminating an original (not shown) lying on an original holder 16, reflecting mirrors 17, 18, 20 and 21, and a lens system 19. Thus, the reflected light from the original takes the path as indicated by the one-dotted line and it impinges upon the surface of the drum 1. It is to be noted that the lamp 15 and a pair of mirrors 17 and 18 together form an integrated optical system. The original holder 16 and the optical system must be moved with respect to each other to carry out scanning of the original placed on the original holder 16. Thus, the original holder 16 may be provided to be reciprocatingly movable with providing the optical system comprised of the lamp 15 and a pair of mirrors 17 and 18 stationarily, and vice versa.

In the case where the original holder 16 is reciprocatingly movable, the position of the original holder 16 shown in FIG. 1 may be considered as a home position. During an exposure period, the original holder 16 moves to the right for a viewer looking into FIG. 1. And upon completion of the image exposure, the original holder 16 returns to the home position, or moves to the left for a viewer looking into FIG. 1. When the original holder 16 arrives at the home position, it stays still for a while and it again moves to the right for carrying out the next following exposure. The same holds true for the case where the original holder 16 is fixedly provided and the optical system is provided to be movable in a reciprocating manner.

Figure 2:
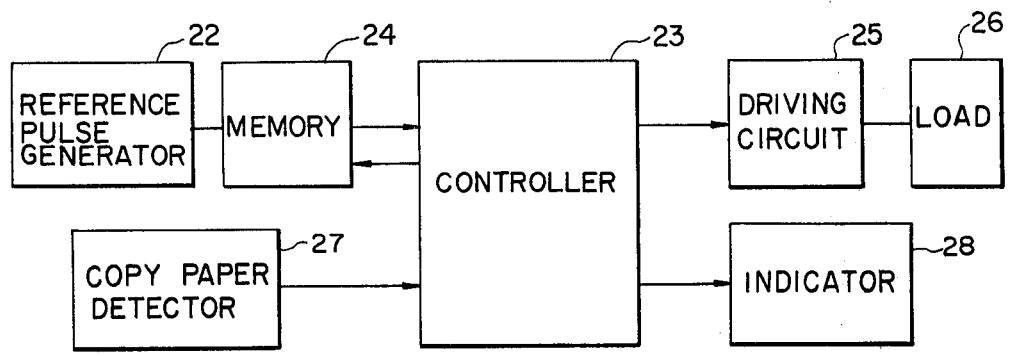
FIG. 2 is a block diagram showing a system for controlling the wait time in accordance with one embodiment of the present invention.

Referring now to FIG. 2, there is shown a control system for controlling the wait time of the original holder 16 or optical system at the home position in a repetitive reproduction mode. As shown, a reference pulse generator 22 generates a pulse signal in synchronism with the main motor 2 or photosensitive drum 1 and supplies it to a controller 23 through a memory 24. The controller 23 comprises a counter which counts the number of pulses supplied from the generator 22 through the memory 24 and then the controller 23 supplies a signal to a driving circuit 25 in response to the counted value NT thereby a driving signal is supplied from the driving circuit to a load 26.

Figure 3:
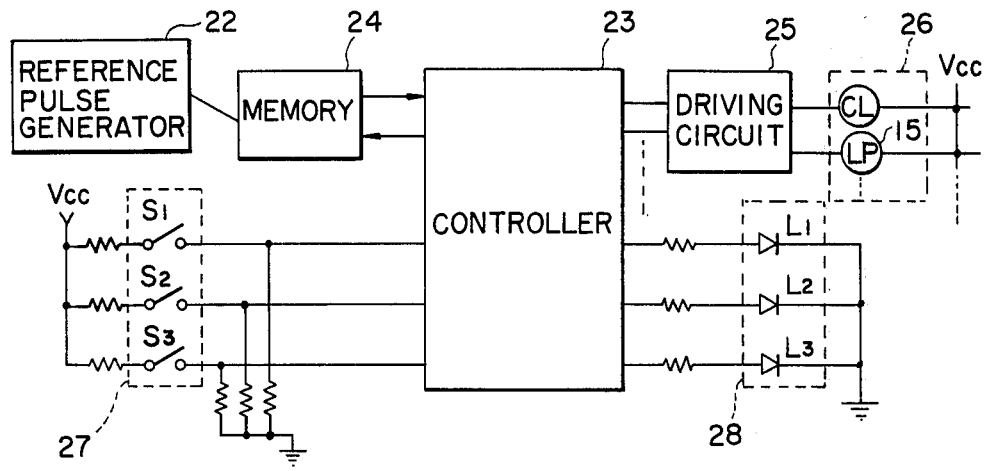
FIG. 3 is a circuit diagram partly in blocks which corresponds to FIG. 2.

A copy paper detector 27 is provided to supply a size signal associated with the size of copy papers stored in the magazine 6 to the controller 23. An indicator 28 is provided to receive a signal from the controller and it indicates the size of the copy papers stored in the magazine 6 to allow visual observation by the operator. As shown in FIG. 3, the copy paper detector 27 may be comprised of a plurality of switches $S_1$ through $S_3$ which are selectively operated by a projection 6a provided on the magazine 6. The indicator 28 may be comprised of a plurality of light emitting diodes $L_1$ through $L_3$ which are selectively activated in association with the operation of the switches $S_1$ through $S_3$. The load 26 may include such elements as a clutch CL which connects the driving source to the optical system comprised of the lamp 15 and a pair of mirrors 17 and 18, the lamp 15 and other components of the reproduction apparatus.

Figure 5:
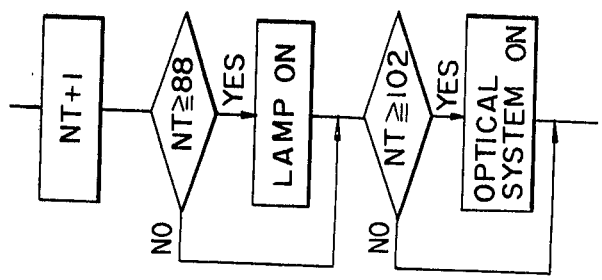
FIG. 5 is another flow chart showing also a part of the operation of the system shown in FIGS. 2 and 3.
Figure 4:
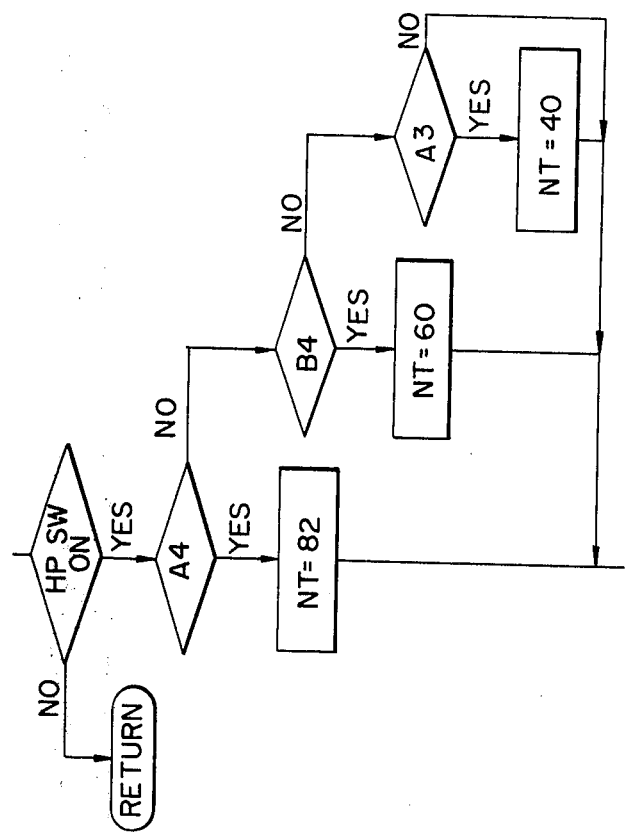
FIG. 4 is a flow chart showing a part of the operation of the system shown in FIGS. 2 and 3.

Now, description will be had as to the operation of the system shown in FIGS. 2 and 3 with particular reference to FIGS. 4 and 5. As shown in FIG. 4, the controller 23 receives a signal from a home position switch 16a which determines whether the original holder 16 is in home position or not. When the controller 23 receives from the home position switch 16a, a signal indicating that the switch 16a, is on, or the original holder 16 is at home position, the controller 23 sets the value of the counter to a predetermined value in consideration of the size signal supplied from the copy paper detector 27. Suppose that the copy paper size is A4 and therefore the switch $S_1$ is on, then the counter NT is set to the value of "82." On the other hand, if the copy paper size is B4 with the switch $S_2$ on, then the counter NT is set to "60." Similarly, for the copy paper size A3 with the switch $S_3$ on, the counter NT is set to "40."

Then, the counter NT starts counting from the set value as described above, and when the counted value becomes equal to "88", the exposure lamp 15 is lit, as shown in FIG. 5. Furthermore, when the counter NT reaches the value "102", the original holder 16 starts its advancing movement. Then, the original holder 16 executes a reciprocating motion and when it returns to the home position, the home position switch 16a, such as a limit switch, is turned on again thereby the counter NT is set to a predetermined value in response to the size signal from the copy paper detector 27.

Accordingly, the wait time of the original holder 16 at home position in accordance with the present invention is determined by a period between the time when the counter NT is set to a predetermined value by turning on the switch 16a and the time when the counter NT reaches the value "102." It will thus be understood that the present invention allows to set an appropriate wait time for each copy paper size.

While the above provides a full and complete disclosure of the preferred embodiment of the present invention, various modifications, alternate constructions and equivalents may be employed without departing from the true spirit and scope of the invention. For example, the optical system instead of the original holder 16 may be provided to be reciprocatingly movable and a home position switch for detecting the existence of the optical system at its home position may be provided instead of the home position switch 16a. Moreover, in a reproduction apparatus having a variable magnification function, the wait time of the original holder 16 or optical system, whichever is movable, may be adjusted in consideration of the size of an original. Therefore, the above description and illustration should not be construed as limiting the scope of the invention, which is defined by the appended claims.

What is claimed is:

1. Apparatus for making at least one copy from an original comprising:
   an original holder for holding thereon said original;
   image forming means having an image forming surface on which a copy image of said original is to be formed,
   an exposure system for exposing an image of said original onto said image forming surface;
   driving means for intermittently driving after a wait time period either one of said original holder or at least a part of said exposure system for image exposing motion relative to the other, in a reciprocating manner between a home position from where an image exposing motion is initiated and an advanced position from where a returning motion back to said home position is initiated;
   transferring means for transferring said copy image formed on said image forming surface to a transfer medium; and
   wait time period control means for controlling the length of a wait time period at said home position between completion of a returning motion and initiation of a next image exposing motion of said one of said original holder or at least a part of said exposure system in response to the size of said original or transfer medium.

2. The apparatus of claim 1 wherein said wait time period control means includes a detector for detecting the size of said original or transfer medium.

3. The apparatus of claim 1 wherein said wait time period control means includes a reference pulse generator for supplying a reference pulse signal, a controller having a counter to count the number of pulses received from said reference pulse generator until it counts up to a first predetermined value when said image exposing motion is initiated and a detector for supplying a size signal having the size information of said original or transfer medium to said controller, said size signal setting the value of said counter to a second predetermined value which is smaller than said first predetermined value, the difference between said second and first values determining said wait time period.

4. The apparatus of claim 3 further comprising a home position switch which is turned on when said original holder or at least a part of said exposure system, whichever is movable, has returned to the home position thereby setting the counter to said second predetermined value.

5. The apparatus of claim 3 wherein said detector includes a plurality of switches, each corresponding to a particular size of said transfer medium, which are selectively operated by an associated actuating means provided on a magazine for storing therein a quantity of transfer medium of a predetermined size.

6. The apparatus of claim 5 wherein said actuating means is a projection formed on said magazine.

7. The apparatus of claim 1 wherein said wait time period control means controls the length of said wait time period at said home position to be longer for a longer size of said original or transfer medium.

* * * * *